United States Patent [19]

Hoch et al.

[11] Patent Number: 5,152,382
[45] Date of Patent: Oct. 6, 1992

[54] ACCELERATOR PEDAL AND BRAKE MECHANISM

[75] Inventors: John J. Hoch, Columbus; James E. Hardzinski, Horicon, both of Wis.

[73] Assignee: Deere & Company, Moline, Ill.

[21] Appl. No.: 769,046

[22] Filed: Sep. 30, 1991

Related U.S. Application Data

[62] Division of Ser. No. 471,294, Jan. 26, 1990.

[51] Int. Cl.⁵ .................. B60K 23/00; B60K 41/20
[52] U.S. Cl. .................. 192/4 R; 74/483 R; 180/336; 192/1.47
[58] Field of Search ........... 192/1.47, 1.57, 4 R, 192/11; 74/483 R; 180/336

[56] References Cited

U.S. PATENT DOCUMENTS

| | | | |
|---|---|---|---|
| 2,065,354 | 12/1936 | Streen | 192/1.47 |
| 2,229,056 | 1/1941 | Dick | 192/1.47 |
| 2,532,544 | 12/1950 | Etnyre | 192/1.47 X |
| 2,657,778 | 11/1953 | Nallinger | 192/1.47 |
| 3,777,585 | 12/1973 | Plamper . | |
| 3,912,056 | 10/1975 | Neal | 192/1.47 X |
| 4,176,560 | 12/1979 | Clake . | |
| 4,759,417 | 7/1988 | Wanie et al. | 180/6.34 |
| 4,771,856 | 9/1988 | Hutchison et al. | 180/333 |

Primary Examiner—Rodney H. Bonck

[57] ABSTRACT

A mechanism connecting a rate control with a brake control for preventing the rate control from being shifted from a non-driving mode to a driving mode when the brake control means is in its parked mode, including a rod-like member having an offset portion biased to block an accelerator arm of the rate control, and a cam member in contact with the offset portion for allowing the offset portion to shift to its blocking position when the brake control is shifted to the parked mode, and for shifting the offset portion to a position whereat the accelerator arm is free to shift between the driving and non-driving modes when the brake control is in the unbraked mode.

11 Claims, 6 Drawing Sheets

ACCELERATOR PEDAL AND BRAKE MECHANISM

This application is a division of application Ser. No. 07/471,294, filed Jan. 26, 1990.

BACKGROUND OF THE INVENTION

1. Field of the Invention

The invention relates to an accelerator pedal and brake system for use in vehicles such as rider mowers.

2. Description of the Prior Art

Many conventional belt-driven rider mowers provide driving controls that include a hand actuated lever for selecting the forward or reverse mode, a hand actuated lever for selecting the speed of travel, and a foot actuated clutch pedal which acts to override the speed select lever. The operator begins the mowing operation by starting the mower's engine while the speed select lever is in a neutral or non-driven mode. The operator then initiates forward progress in one of two ways. First, he may slowly shift the speed select lever to a desired speed without depressing the clutch pedal. As the operator shifts the speed control lever a linkage connected to the speed control lever causes an idler arm to swing an idler pulley into a belt, thus causing a variator pulley to be adjusted, as generally described in U.S. Pat. No. 4,771,856. The adjustment of the variator pulley increases the rate at which power is transmitted to the driven wheels, thus increasing the vehicles ground speed. Secondly, the operator can move the speed select lever to a desired setting while depressing the clutch pedal, and then gradually release the clutch pedal to cause the vehicle to assure the desired speed selected by the speed select lever. The clutch pedal is connected via a linkage to the idler arm such that when the clutch pedal is depressed the variator pulley will assume a non-driven mode, regardless of the position of the speed select lever. Some mowers utilize a lost motion coupling between the clutch pedal linkage and the idler arm that allows the clutch pedal to override the speed select lever. As the speed select lever is shifted from a neutral to a driven position when the operator is depressing the clutch pedal, the vehicle remains non-driven. When the operator releases the clutch pedal the variator pulley is allowed to assume the position corresponding to the position of the speed select lever.

Once the desired speed has been attained, the vehicle may be slowed or stopped in a number of ways. The operator may shift the speed select lever to a slower or non-driven setting. The operator may also depress the clutch pedal to slow the mower. When the operator wishes to again increase speed to the predetermined level he releases the clutch pedal and the vehicle resumes the rate of travel corresponding to the position of the speed control lever. Finally, the operator may slow or stop the mower by depressing a brake pedal. Some mowers of this type provide a tab connected with the brake pedal behind and in confronting relation with a tab connected with the clutch pedal. As the operator depresses the brake pedal the brake pedal tab engages the clutch pedal tab, which causes the clutch pedal to be actuated automatically as the operator depresses the brake pedal. These vehicles thereby assume a non-driven mode when the operator engages the brake pedal to stop or slow the vehicle.

Some of these mowers are provided with a parking brake feature. To apply the parking brake the operator depresses the brake pedal fully and shifts a parking brake lever that acts to maintain the brake pedal in its engaged position. When the parking brake is being used the tabs between the brake pedal and the clutch pedal act to keep the clutch pedal depressed such that the operator can not unintentionally drive the vehicle when its parking brake is applied. This prevents the vehicle, and particularly the brake mechanism, from being damaged by driving the vehicle when the parking brake is applied.

This type of conventional mower allows for normal mowing operation without requiring the operator to manipulate any controls unless he desires to stop mowing or slow the vehicle when mowing around obstacles. Therefore, these vehicles do not provide for an operator presence feature that automatically stops the vehicle when the operator has left the mower. Many of these vehicles allow the operator to shift between the forward and reverse modes while in a driving mode, which can cause damage to the vehicle. These vehicles generally make no provision for the speed to be limited while in the reverse mode. Also, the pedal and lever configuration may not be familiar to the average person and may require a certain level of operator expertise. The pedals and levers permit the operator to change the speed of the mower by moving the hand actuated lever without depressing the foot actuated clutch pedal. This method of varying the speed can be difficult and can cause the mower to lurch or jerk as the lever is moved abruptly.

Another type of conventional rider mower utilizes an accelerator pedal to select a desired speed for the vehicle. These mowers also include a brake pedal to slow or stop the vehicle and a hand actuated lever that selects the mower's forward or reverse mode. Many of these mowers allow the operator to shift between the forward and reverse modes while the vehicle is being driven, which can cause wear to the vehicle. Many of these mowers allow the vehicles to be driven in reverse at a rate equal to its rate of travel in the forward mode. It is known to provide such mowers with a parking brake, but many such mowers allow the accelerator pedal to be depressed while the parking brake is engaged. This allows the vehicle to be driven with the parking brake on, which may eventually damage the vehicle.

Many of these vehicles provide an accelerator pedal comprised of a flat surface on which the operators foot rides. These pedal surfaces, much like an automobile's pedals, are generally larger than the brake pedal surfaces so that the operator can easily differentiate between the two. To manipulate the accelerator pedal, the operator must bend his ankle through an arc corresponding to the arc through which the pedal surface travels. In many cases, this arc is so great that the operator must bend his ankle to an uncomfortable degree or lift his heel from the operator station floor when the pedal nears either of its extreme positions. When the operator lifts his heel the speed of the mower can be difficult to regulate and the operator can become fatigued easily. Some pedals travel through a smaller arc in an attempt to eliminate the extreme angles that the ankle must accommodate, but because of this smaller arc it is more difficult to finely adjust the vehicle speed.

Another type of rider mower provides for two accelerator pedals: one for the forward direction and the other for the reverse direction. The operator begins by starting the engine, and initiates forward movement by depressing the forward accelerator pedal with his foot.

The operator depresses the pedal to a point corresponding to a desired speed, and the operator must continue to depress the pedal to maintain that speed. An operator presence feature is thereby provided since the vehicle will come to a stop after the accelerator pedal is released. When the operator wishes to back up the vehicle he must remove his foot from the forward pedal to depress the reverse accelerator pedal. The operator is thereby prevented from shifting from the forward to the reverse mode while the mower is being driven, since the wheels are not being driven when the operator lifts his foot from the forward pedal to the reverse pedal. The reverse speed can be limited in this type of mower by restricting the range of motion of the reverse accelerator pedal. Parking brakes have been provided on this type of mower, and have provided mechanisms for preventing the mower from being driven while the parking brake is engaged. A mower having this type of pedal arrangement is unfamiliar to many first time users and requires a certain level of operator expertise.

Another type of rider mower provides an accelerator pedal that causes the vehicle to be propelled forward when the operator depresses the forward end or toe of the pedal, and propels the mower in the reverse direction when the operator depresses the rear end or heel of the pedal. Mowers of this type may also be unfamiliar to first time users and require a threshold level of operator expertise. This type of pedal arrangement can also be difficult to operate over rough terrain since the operator must hold his leg above the floor of the operator station with his foot positioned on the movable pedal. The operator therefore lacks the stability that would be available if he were able to keep part of his foot on the floor of the operator station.

SUMMARY OF THE INVENTION

It is therefore desirable to provide a vehicle as used for mowing vegetation that provides an operator presence feature, that prevents the operator from shifting the vehicle between forward and reverse modes when the vehicle wheels are being driven, and one in which the speed is limited when in reverse mode. It would be desirable to provide such a mower with controls that are familiar to the general public, such as those encountered in the operation of automobiles having automatic transmissions. The level of operator expertise required to operate the vehicle would thereby be minimized. It would be desirable to provide such a mower with a mechanism that prevents the vehicle from being driven when the parking brake is engaged. It would also be desirable to provide such a mower with an accelerator pedal that is comfortable for the operator to manipulate through its entire range of rotation.

In the preferred embodiment of the present invention a vehicle is provided for use in the mowing of vegetation that includes a foot actuated accelerator pedal and linkage that adjusts the rate that power is transferred to the drive wheels via a variator pulley drive mechanism. A hand actuated selection lever and linkage is provided that selects the forward or reverse mode of the transmission. An interlock mechanism is provided between the accelerator linkage and the selection lever linkage that prevents the selection lever from being shifted between modes when the operator is depressing the accelerator pedal with his foot. The interlock mechanism also acts to limit the velocity of the vehicle when in the reverse mode. The interlock mechanism of the preferred embodiment comprises an interlock rod connected with the accelerator linkage and a swingable interlock pawl. The interlock rod causes the pawl to swing as the accelerator pedal is depressed. A selection arm contained in the shift control linkage restricts the range of motion of the interlock pawl when the shift lever has selected the reverse mode, thereby limiting the vehicle's velocity in reverse. A stop rod is also provided in the preferred embodiment that rides on a cam fixed to the brake pedal. As the brake pedal is depressed to engage the parking brake the cam rotates with the pedal and the stop rod swings downwardly due to the force of a spring. When in this downward position corresponding to the brake pedal being depressed the stop rod prevents an arm of the accelerator pedal linkage from shifting to a driving position. The stop rod thereby prevents the accelerator pedal from being inadvertently depressed when the parking brake is engaged. The accelerator of the preferred embodiment has an upper portion that is engaged by the ball of the operator's foot as he initially engages the pedal. The lower portion of the pedal forms an angle to the upper portion such that the middle or lower part of the operator's foot engages the lower portion of the pedal as the operator depresses the pedal further.

Related subject matter is found in U.S. application Ser. No. 07/254,768, filed Sep. 17, 1988, which is assigned to the assignee of the present application.

BRIEF DESCRIPTION OF THE DRAWINGS

FIG. 4 does not show the stop rod.

FIG. 5 does not show the stop rod.

FIG. 6 does not show the stop rod.

DETAILED DESCRIPTION OF THE PREFERRED EMBODIMENT

Figure 1:
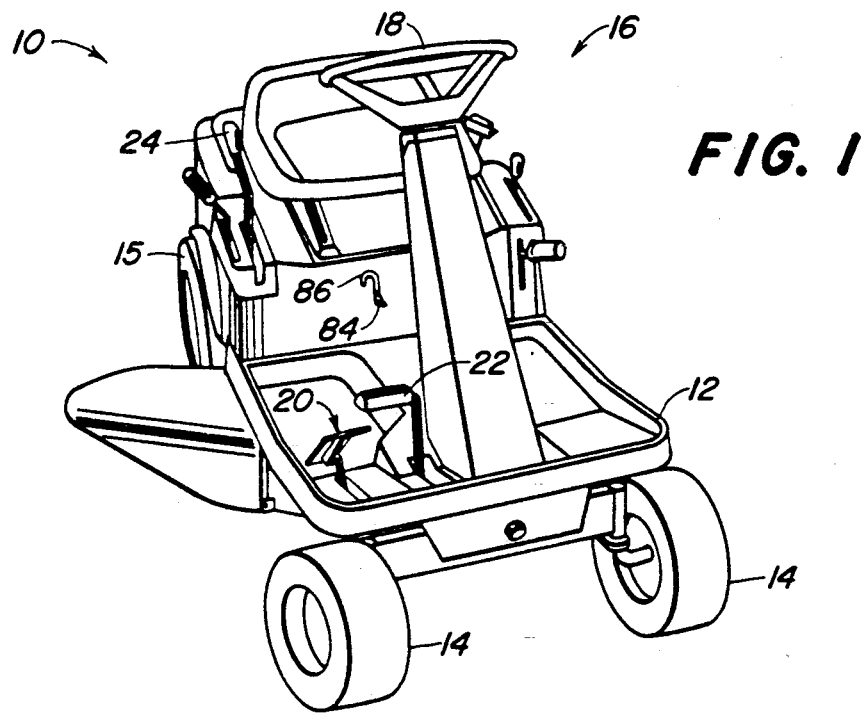
FIG. 1 is a perspective view of a riding mower embodying the present invention.
Figure 7:
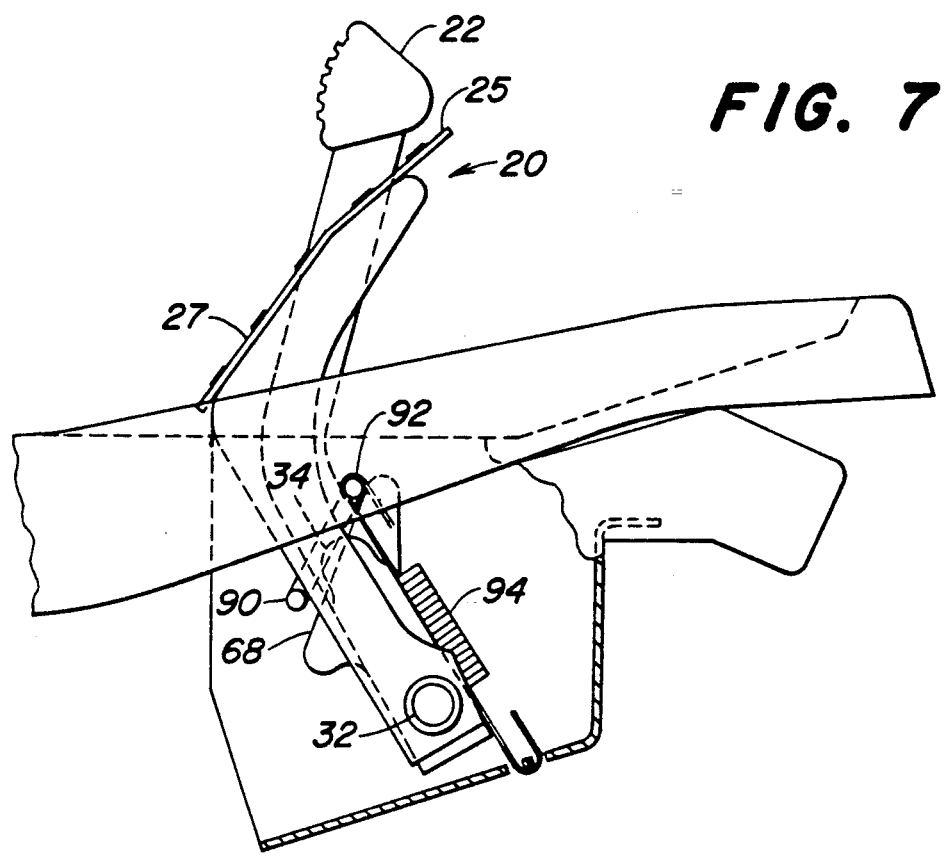
FIG. 7 is a side view of the preferred accelerator pedal configuration, the brake pedal and stop rod when the parking brake is not engaged.
Figure 8:
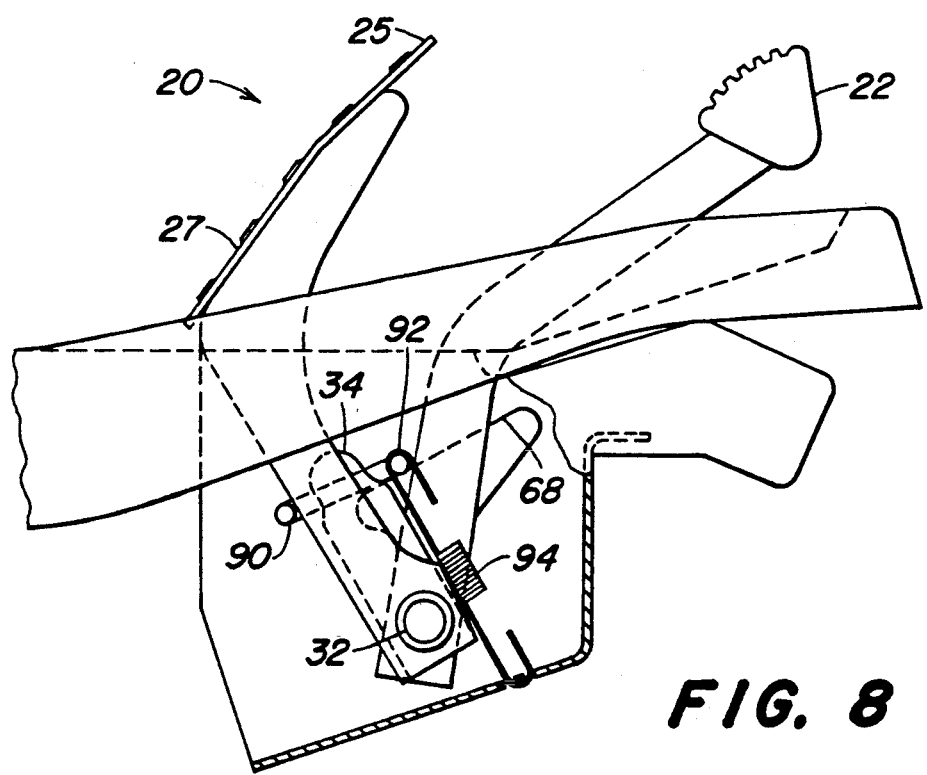
FIG. 8 is a side view of the pedals illustrated in FIG. 7 and the stop rod when the parking brake is engaged.
Figure 9:
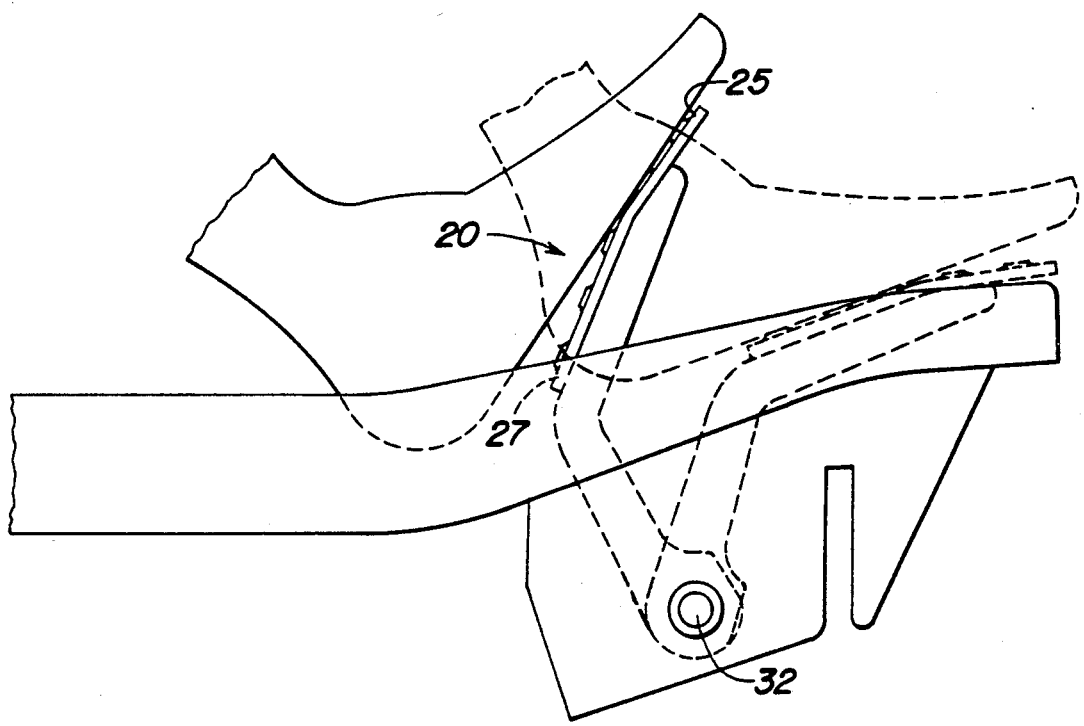
FIG. 9 is a side view of the accelerator pedal showing its depressed position and its released position in solid lines and its depressed position in phantom.

Referring to FIG. 1, a vehicle 10 is provided for use in the mowing of grass. The vehicle 10 has a frame 12, ground engaging wheels 14, 15, and an operator station 16. The operator station 16 includes a steering wheel 18, a foot actuated accelerator pedal 20, a foot actuated brake pedal 22, and a hand actuated forward-reverse direction control lever 24. As FIGS. 7, 8 and 9 show, the accelerator pedal 20 has an upper portion 25 that forms an angle with the rear portion 27 of the pedal. The frame 12 carries a power source (not shown) such as a motor or engine. The power source transmits power to the rear wheels in the preferred embodiment via a variator belt drive mechanism and transmission as generally described in U.S. Pat. No. 4,771,856, which patent is assigned to the assignee of the present application and the disclosure of which is herein incorporated by reference.

To adjust the speed of the vehicle an idler pulley 26 (see FIG. 4) is mounted on a swingable idler arm 28 to selectively place tension on a belt 30 that acts to adjust a variator pulley as the pedal is depressed.

Figure 4:
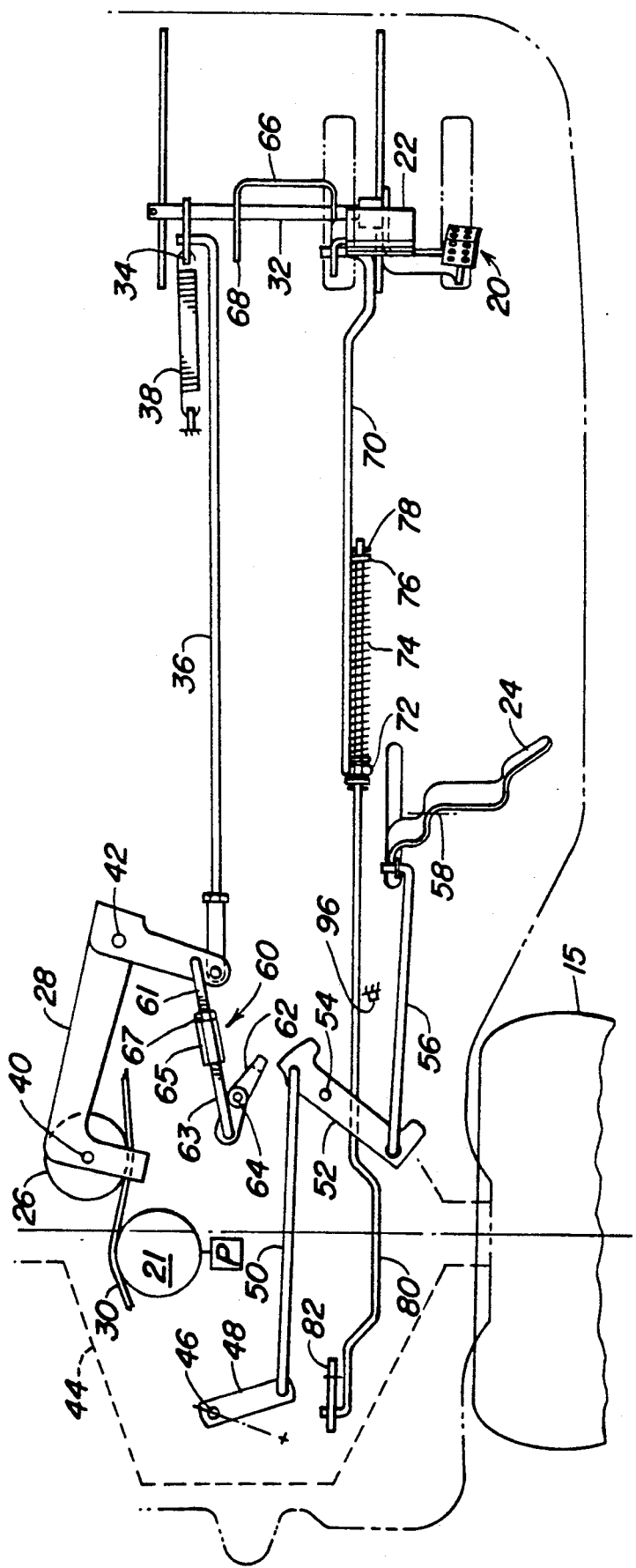
FIG. 4 is a partial overhead view of the present invention, with the accelerator and brake pedal released and the direction control lever in its forward mode.

The accelerator pedal 20 is positioned to the right of the steering wheel 18 in the operator station 16. The pedal 20 is fixed for rotation with an accelerator shaft 32 that is rigidly connected to an accelerator arm member 34, as shown in FIG. 4. The accelerator arm 34 is swingably attached to an accelerator rod 36 and biased to swing rearwardly by means of a spring 38 fixed to the frame 12. The accelerator rod 36 extends rearwardly and is swingably connected to the swingable idler arm 28. The idler arm 28 carries the swingable idler pulley 26 on a shaft 40 and is swingably supported by the frame 12 by a shaft 42.

The transmission 44 is located between the vehicle's rear wheels 15 and has a mode selection shaft 46 whose position determines whether the transmission 44 is in a forward or reverse mode. A mode arm 48 is rigidly connected to the mode selection shaft 46 and is swingably coupled with one end of a first selection rod 50. The other end of the first selection rod 50 is swingably connected to a selection arm member 52 which is swingably connected to the frame 12 by a shaft 54. A second selection rod 56 connects the selection arm 52 to the hand actuated direction control lever 24. The direction control lever 24 is swingably fixed to the frame 12 by a pin member 58.

Swingably attached to the idler arm 28 is a connecting rod or interlock rod 60 comprised of front and rear rod members 61, 63 whose adjacent ends are threaded in opposite directions. A threaded adjusting member 65 couples the front and rear rods 61, 63 together. The adjusting member 65 can be rotated to adjust the length of the interlock rod 60 to accommodate for manufacturing tolerances and belt wear. A jam nut 67 is also threaded on the front rod member 61 in abutment with the adjusting member 65 to prevent the adjusting member 65 from rotating due to vibrations of the vehicle. The interlock rod 60 extends rearwardly to swingably couple itself to a connecting arm or interlock pawl 62. The interlock pawl 62 is swingably fixed to the frame 12 by a pin member 64.

Figure 2:
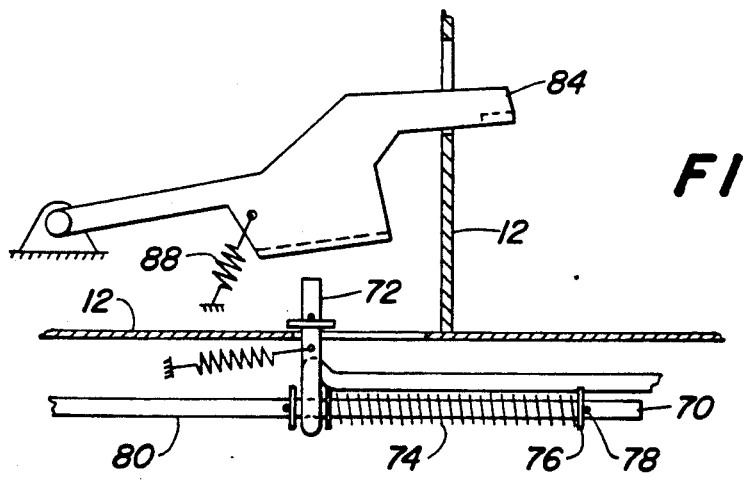
FIG. 2 is a side view of the parking brake lever mechanism in its disengaged mode.

The brake pedal 22 of the preferred embodiment is positioned to the right of the steering wheel 18 but to the left of the accelerator pedal 20. The brake pedal 22 extends downwardly to form a U-shaped portion 66 which is rotatably mounted on the accelerator shaft 32. A cam 68 is formed on one end of the U-shaped portion 66. A front brake rod 70 having a rear upturned portion 72 is swingably connected to the brake pedal 22 above the accelerator shaft 32 and is coupled via a spring 74 and washer 76 to a rear brake rod 80. The rear brake rod 80 is connected to a brake arm 82 whose position controls the braking of the vehicle. A parking brake lever 84 protrudes from the frame 12 through an inverted J-shaped slot 86, as shown in FIG. 1. The parking brake lever 84 is swingably mounted to the frame 12 at its rearward end and is biased downwardly by a spring 88 mounted to the frame 12, as shown in FIG. 2.

Figure 10:
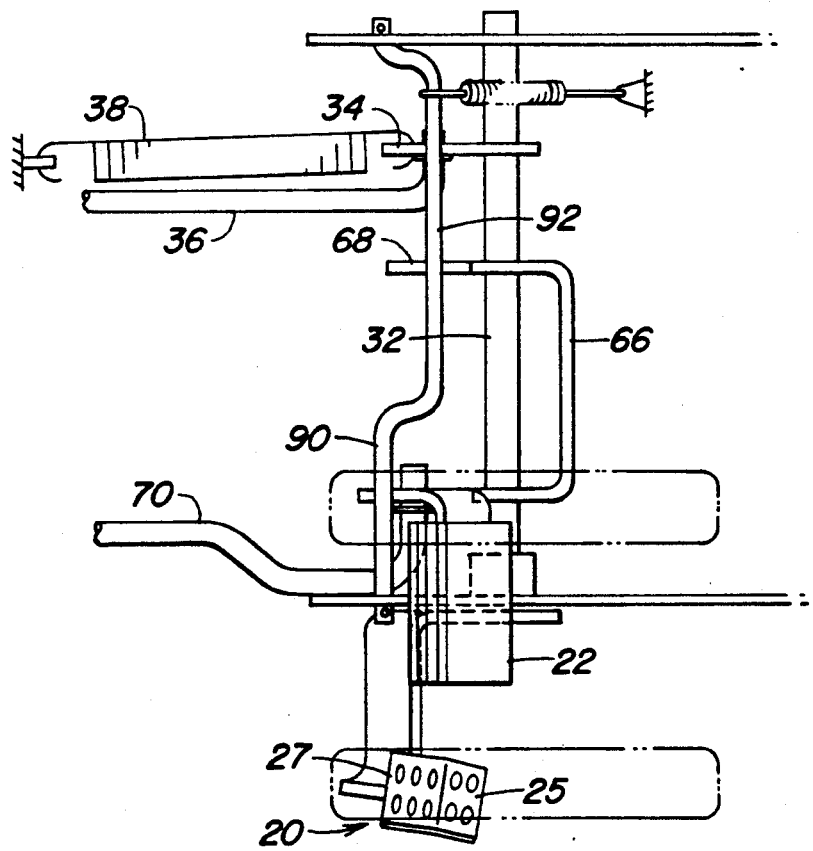
FIG. 10 is an overhead view of the stop rod with the accelerator and brake pedals in released positions.

A stop rod 90, shown in FIGS. 7, 8 and 10, is rotatably mounted to the frame 12 above and behind the accelerator shaft 32. The stop rod 90 has an offset portion 92 that is offset from the stop rod's axis of rotation and that rides on the cam 68 formed in the U-shaped portion 66 of the brake pedal 22. A spring 94 mounted to the frame 12 biases the stop rod 90 to rotate clockwise as the brake pedal 22 is depressed.

Next, the operation of the present invention will be explained. To initiate forward progress of the vehicle, the operator depresses the accelerator pedal 20 with his foot. The accelerator pedal 20 is thereby caused to swing forwardly, and the accelerator shaft 32 and accelerator arm member 34 rotate therewith against the force of the spring 38. The movement of the accelerator arm member 34 causes the accelerator rod 36 to shift forwardly. The accelerator rod 36 thereby pulls on the idler arm 28, causing the arm 28 to swing in a counterclockwise manner, as viewed in FIG. 6. This causes the swingable idler pulley 26 fixed to the idler arm 28 to apply tension to the belt 30, which causes the variator to be adjusted to an increased speed setting. As the idler arm 28 rotates counterclockwise, the interlock rod 60 thereattached is pulled forwardly, causing the interlock pawl 62 to swing in a clockwise direction. When the interlock pawl 62 is in a position corresponding to the accelerator pedal 20 being depressed, the presence of the interlock pawl 62 blocks the movement of the selection arm 52 such that the operator can not shift the direction control lever 24 between the forward and reverse modes. The operator is thereby prevented from shifting the vehicle between forward and reverse when he is depressing the accelerator pedal 20 with his foot.

Once the operator takes his foot off of the accelerator pedal 20 he can move the direction control lever 24 to its reverse position The operator does this by pulling rearwardly on the direction control lever 24, which causes the second selection rod 56 to be pulled forwardly. The second selection rod 56 thereby causes the selection arm 52 to rotate counterclockwise, which pushes the first selection rod 50 rearwardly. The first selection rod 50 thus causes the mode arm 48 to swing clockwise and to thereby rotate the mode selection shaft 46 to its reverse mode. Once the operator has moved the direction control lever 24 to its reverse position, the operator must depress the accelerator pedal 20 to propel the vehicle rearwardly. As the accelerator 20 is depressed, the accelerator rod 36 swings the idler arm 28 counterclockwise to increase the reverse speed. The interlock rod 60 moves forwardly with the idler arm 28, causing the interlock pawl 62 to rotate clockwise. The range of movement of the interlock pawl 62 is limited by the presence of the selection arm 52 in its reverse mode, and the range of movement of the idler arm 28 is thereby also limited. By limiting the range of movement of the interlock pawl 62 during the reverse mode, the speed of the vehicle is limited in reverse. In the preferred embodiment the operator can only achieve a reverse speed equal to about half the maximum speed attainable in the forward direction. A stud 96 welded to the frame abuts the selection arm 52 in its reverse mode and acts to prevent the selection arm 52 from rotating further in a counterclockwise direction when the operator depresses the accelerator pedal 20 with a heavy force of his foot. Also, the operator is prevented from shifting from the reverse to the forward mode when he is depressing the accelerator pedal 20 since movement of the shift control arm 52 is blocked by the interlock pawl 62.

When the operator lifts his foot from the accelerator pedal 20 to slow or stop the vehicle, the accelerator rod 36 shifts rearwardly under the force of the spring 38, and the idler arm 28 swings in a clockwise manner to a position where no tension is placed on the belt 30. As the idler arm 28 swings clockwise the interlock rod 60 is pushed rearwardly, which swings the interlock pawl 62 counterclockwise. In this configuration the interlock pawl 62 is not in a position to block the movement of the selection arm 52. Thus, the direction control lever 24 can be shifted between forward and reverse only when the accelerator pedal 20 is released.

Referring to FIG. 4, the accelerator pedal 20 there shown is in a released position and the direction lever 24 is in the forward position. The idler arm 28 is in an extreme clockwise position wherein the idler pulley 26 is not tensioning the belt 30, and the wheels 15 are not being driven. The interlock pawl 62 as shown is in its extreme counterclockwise position, which would allow the selection control arm 52 to swing between its forward and reverse positions. The position of the interlock pawl 62 as shown would therefore permit the direction control lever 24 to be moved from the forward position as shown to its reverse position.

Figure 5:
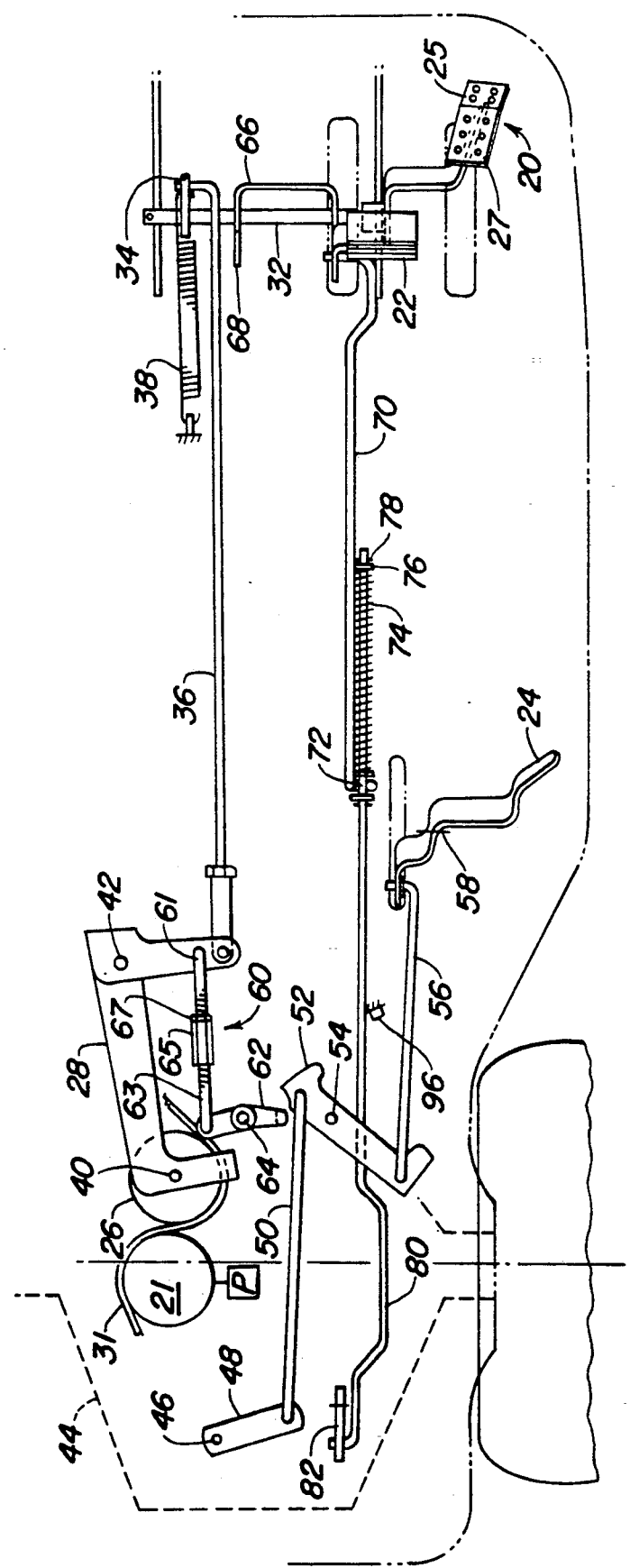
FIG. 5 is a partial overhead view of the present invention, with the accelerator pedal depressed, the brake released and the direction control lever in its forward mode.

FIG. 5 illustrates the present invention when the accelerator 20 is engaged and the direction control lever 24 is in its forward mode. The idler arm 28 is in an extreme counterclockwise position corresponding to the accelerator pedal 20 being depressed. Power is therefore being transferred to the wheels 15 from the power source via the variator pulley mechanism. The interlock rod 60 has been pulled forwardly by the idler arm 28 and has swung the interlock pawl 62 to an extreme clockwise position. The position of the interlock pawl 62 as shown blocks the selection arm 52 from pivoting and the operator is therefore prevented from shifting the direction control lever 24 from forward to reverse mode.

Figure 6:
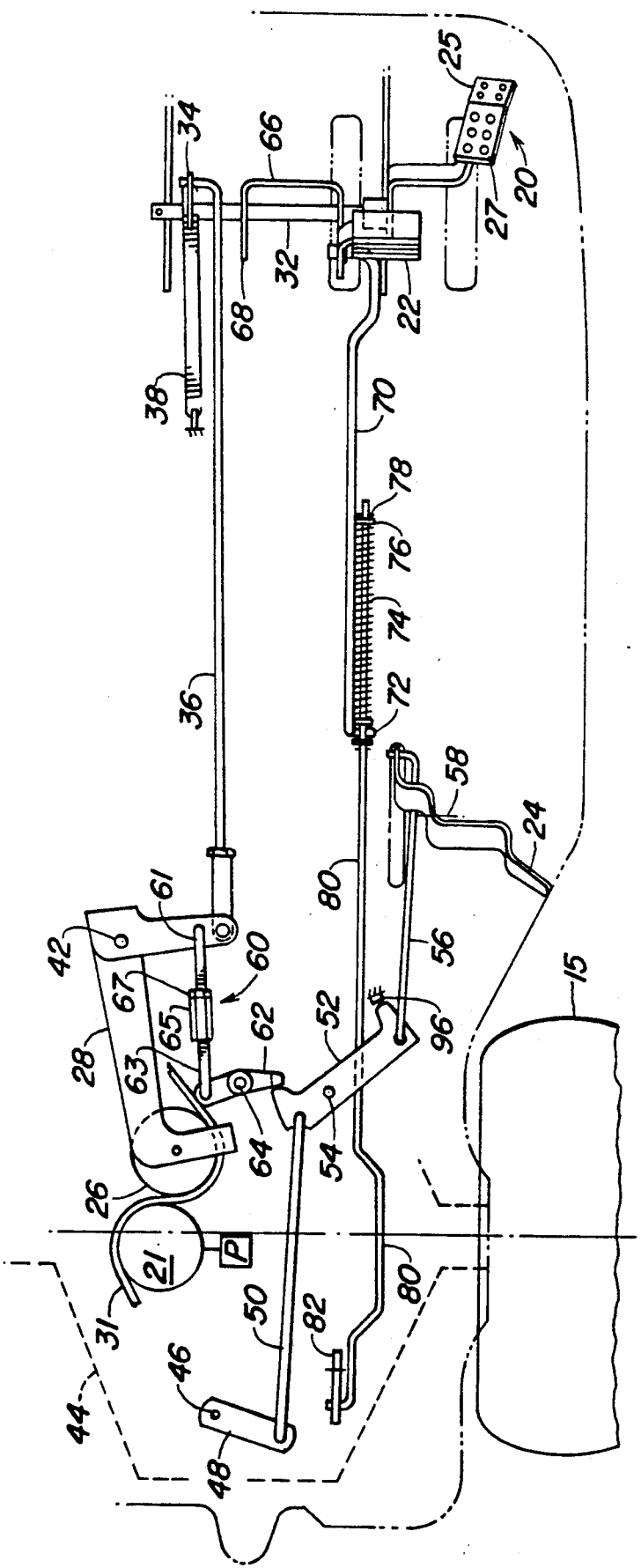
FIG. 6 is a partial overhead view of the present invention, with the accelerator pedal depressed and the brake pedal released and the direction control lever in its reverse mode.

FIG. 6 illustrates the present invention when the accelerator pedal 20 is engaged and the direction control lever 24 is in its reverse mode. The selection arm 52 is in an extreme counterclockwise position and the first selection rod 50 has been displaced rearwardly, thereby pivoting the mode arm 48 rearwardly to its reverse position. The interlock pawl 62 has been displaced to an extreme clockwise position such that it is in contact with the selection arm 52. The selection arm 52 as shown in the reverse mode acts to block the interlock pawl 62 from rotating further in the clockwise direction. The idler arm 28 is prevented from rotating further in the counterclockwise direction because it is linked to the interlock pawl 62 by the interlock rod 60. The idler arm 28 and swingable idler pulley 26 are prevented from further tensioning the belt 30. The speed of the vehicle is thereby limited when driving in the reverse direction.

Referring now to FIGS. 7 and 8, there is shown side views of the preferred embodiment of the accelerator pedal 20. This pedal assumes an angled form and includes first and second surfaces 25, 27. When the operator wishes to drive the mower he begins to depress the accelerator pedal 20. In doing so, the toe portion or ball of the operator's foot comes in contact with the upper portion 25 of the accelerator pedal 20. As he depresses the pedal 20 further the pedal 20 continues to rotate until the middle or lower portion of the operator's foot comes in contact with the lower portion 27 of the accelerator pedal. Since the lower portion 27 of the accelerator pedal 20 forms an angle with the upper portion 25, the operator's ankle rotates his foot through a smaller arc when manipulating the pedal than if the pedal 20 were flat. The angle in the accelerator pedal 20 therefore allows the operator's foot to assume a comfortable angle with respect to his lower leg throughout the accelerator pedal's full range of movement without requiring him to lift his heel from the floor of the operator station.

Figure 3:
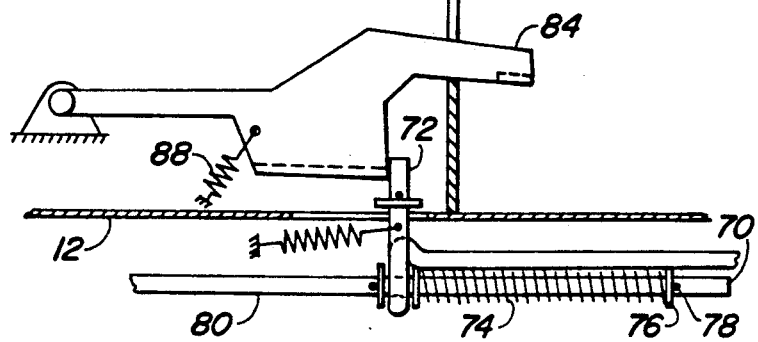
FIG. 3 is a side view of the parking brake lever mechanism in its engaged mode.

When the vehicle has come to a complete stop the operator may wish to engage the parking brake. The operator does this by fully depressing the brake pedal 22, which shifts the front brake rod 70 forwardly (see FIGS. 2 and 3). The operator then shifts the parking brake lever 84 from the upper portion of the inverted J-shaped slot 86 to the lower portion. The parking brake lever 84 is then in abutment with the upturned portion 72 of the front brake rod 70, which keeps the brake pedal 22, the front brake rod 70, and the rear brake rod 80 shifted forwardly. This prevents the brake from being released.

Looking again to FIGS. 7 and 8, it will be seen that when the operator depresses the brake pedal 22, the cam 68 located on the U-shaped portion 66 rotates clockwise. The stop rod 90 abutting the cam 68 is thereby allowed to rotate clockwise under the force of the spring 94. As the stop rod 90 rotates, the offset portion 92 swings downwardly in front of the accelerator arm 34 and blocks forward movement of the arm 34. Since the stop rod 90 blocks the accelerator arm 34 from rotating forwardly the accelerator pedal 20 is prevented from being inadvertently depressed when the parking brake is engaged. The vehicle is thereby prevented from being driven when the parking brake is engaged.

The above preferred embodiment describes the present invention as used with a belt drive mechanism. However, the present invention can be utilized with drive means other than those using belts to transmit power. For example, hydrostatic transmissions and direct drive mechanisms can be employed on a vehicle in cooperation with the present invention.

I claim:

1. A mechanism for preventing a drive means of a powered vehicle from being shifted to a driving mode when in a parked mode, comprising:
    shiftable rate control means for shifting the vehicle between driving and non-driving modes, said rate control means further comprising:
        a first foot actuated pedal,
        a shaft coupled with the first foot actuated pedal for shifting therewith,
        an arm member fixed to the shaft for shifting therewith,
        a linkage coupled with the arm member and the drive means for transferring motion of the arm member and shaft to a vehicle drive means for selectively adjusting the rate at which the vehicle is driven,
    brake control means for braking the vehicle, and adapted for being shifted between unbraked, braked, and parked modes, said brake control means further including a second foot actuated pedal and a U-shaped portion having end portions, means connecting the rate control means to the brake control means for preventing the rate control means from being shifted from the non-driving mode to a driving mode when the brake control means is in its parked mode, said connecting means further including:
a cam member coupled with one end of the U-shaped portion for shifting with the second foot control pedal,
an accelerator arm member coupled with the driving control means for shifting therewith,
a rod-like member shiftable about a longitudinal axis defined by a portion of the rod-like member, said rod-like member having a portion offset from the axis and biased by a spring to a position whereat the accelerator arm is blocked from shifting to a driving mode, said cam member being in contact with the offset portion for shifting the offset portion to a non-blocking position whereat the accelerator arm is free to shift between the driving and non-driving modes when the brake control means is in the unbraked mode, said cam member also allowing the offset portion to shift to its blocking position when the brake control means is shifted to the parked mode.

2. The invention of claim 1, wherein the second foot actuated pedal is coupled with an end portion of the U-shaped portion, and the cam member is formed integral with the other end of the U-shaped portion.

3. A vehicle comprising a plurality of ground engaging wheels;
a frame carried by the wheels;
a power source carried by the frame;
drive means for transmitting power from the power source to at least one of the ground engaging wheels;
control means for adjusting the rate at which power is transferred through the drive means to the wheel, said drive control means being shiftable between driving and non-driving modes;
control means for braking the vehicle, said brake control means adapted for being shifted between unbraked, braked, and parked modes; and
means connecting the rate control means to the brake control means for preventing the rate control means from being shifted from the non-driving mode to a driving mode when the brake control means is in its parked mode, said connecting means further including:
a cam means shiftable with the brake control means,
an accelerator arm means coupled with the driving control means for shifting therewith,
a rod-like means shiftable about a longitudinal axis defined by a portion of the rod-like means, said rod-like means having a portion offset from the axis and biased to a position whereat the accelerator arm is prevented from shifting to a driving mode, said cam means being in contact with the offset portion for shifting the offset portion to a non-blocking position whereat the accelerator arm is free to shift between the driving and non-driving modes when the brake control means is in the unbraked mode, and for allowing the offset portion to shift to its blocking position when the brake control means is shifted to the parked mode.

4. The invention as defined in claim 3 wherein:
the rate control means further comprises:
a first foot actuated pedal;
a shaft fixed to the first foot actuated pedal;
an arm member fixed to the shaft;
the brake means further comprises:
a second foot actuated pedal;
a cam connected with the second foot actuated pedal for shifting therewith.

5. The invention of claim 4 and wherein a linkage is coupled with the arm member and the drive means for transferring motion of the arm member and shaft to the drive means for selectively adjusting the rate at which power is transmitted to the ground engaging wheel.

6. The invention of claim 4, wherein said second foot actuated pedal includes a U-shaped portion having end portions, and said cam is coupled with one end of the U-shaped portion.

7. The invention of claim 6, wherein the second foot actuated pedal is coupled with an end portion of the U-shaped portion, and the cam is formed integral with the other end of the U-shaped portion.

8. The invention of claim 4, wherein a spring biases the offset portion to a position whereat the accelerator arm is prevented from shifting to a driving mode.

9. The invention of claim 8, and wherein a linkage is coupled between the arm member and the drive means for selectively adjusting the rate at which power is transmitted to the ground engaging wheel by transferring motion of the arm member and shaft to the drive means.

10. The invention of claim 3, wherein said brake control means includes a U-shaped portion having end portions, and said cam means is coupled with one end of the U-shaped portion.

11. The invention of claim 3, wherein a spring biases the offset portion to a position whereat the accelerator arm is prevented from shifting to a driving mode.

* * * * *

UNITED STATES PATENT AND TRADEMARK OFFICE
CERTIFICATE OF CORRECTION

PATENT NO. : 5,152,382

DATED : October 6, 1992

INVENTOR(S) : John Joseph Hoch

It is certified that error appears in the above-identified patent and that said Letters Patent is hereby corrected as shown below:

On title page, item [75], should read as following;

Inventors: John Joseph Hoch, Columbus, Wis. and

Item [19] "Hoch et al" should read --Hoch--

Signed and Sealed this

Fifth Day of October, 1993

Attest:

BRUCE LEHMAN

*Attesting Officer*     *Commissioner of Patents and Trademarks*